Dec. 4, 1928.

J. J. SCHMID 1,693,798

AMUSEMENT DEVICE

Filed Sept. 21, 1925    2 Sheets-Sheet 1

Inventor

John J. Schmid.

By Murray and Gugelter

Attorneys.

Dec. 4, 1928.

J. J. SCHMID 1,693,798

AMUSEMENT DEVICE

Filed Sept. 21, 1925    2 Sheets-Sheet 2

Inventor
John J. Schmid
By Murray and Gurgelter
Attorneys

Patented Dec. 4, 1928.

1,693,798

UNITED STATES PATENT OFFICE.

JOHN J. SCHMID, OF LOUISVILLE, KENTUCKY.

AMUSEMENT DEVICE.

Application filed September 21, 1925. Serial No. 57,567.

An object of my invention is to provide an amusement device comprising a plurality of self propelled vehicles adapted to run on rails and controlled from a suitable station by a single operator.

Another object is to provide a simple and efficient self propelled vehicle for use in the amusement device referred to.

Another object is to provide a simple and inexpensive differential rear truck structure, for self propelled vehicles of the kind described.

These and other objects are attained by the means described herein, and disclosed in the accompanying drawings, in which.

Figure 1:
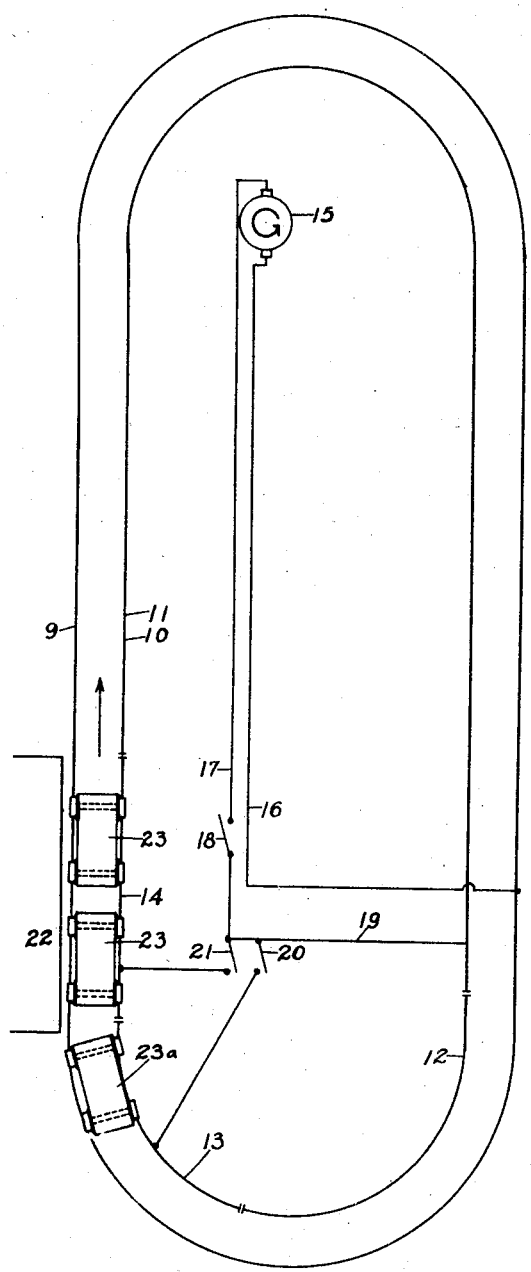
Fig. 1 is a diagrammatic plan view of a rail and electrically controlled means of the device of my invention.

The amusement device of my invention comprises a pair of parallel rails which may be laid out to define a suitable course over which a plurality of self propelled vehicles may travel. At a suitable starting point along the course there is provided a station at which passengers may board and leave the vehicles and at this point there is provided an electrical switching device by means of which a single operator or caretaker may cause the various vehicles to stop, for taking on passengers, and proceed to the major portion of the course. A portion of the rails preceding the loading and discharging station is adapted to receive the vehicles with their car motors shut off so that said vehicles may travel under their own momentum to a controlled section of the rails from whence the operator may move the vehicles one by one to the starting platform. Inasmuch as the occupants of the vehicles do not in any wise control the vehicle it is necessary that operation of the vehicles be simple and that the structure thereof be such as to permit them to travel at a reasonable rate of speed over a circuit on the rail without any danger of becoming derailed.

Parallel rails 9 and 10 are laid upon suitable ties which serve to electrically insulate the rails, one from the other. The rail 9 is continuous throughout the course while the rail 10 is composed of sections 11, 12, 13 and 14, each of which portions are electrically insulated from one another and from the rail 9. Electrical energy from any suitable source, such as the generator 15 is directed to the continuous rail 9 by conductor wire 16 while a second wire 17 of the circuit is provided with a switch 18 which controls the transmission of electrical energy to all parts of the course. The switch 18 is normally closed and is used only in an emergency or when it is desired to complete a shut down of the device. A conductor 19 is permanently connected with conductor 17 and the major section 11 of rail 10, while the sections 13 and 14 are thrown into and out of the electrical circuit by means of switches 20 and 21 which are controlled by the operator who stands adjacent loading platform 22. The section 12 of rail 10 is at no time energized and provides a safety zone into which the vehicles may enter after leaving the main course provided by rails 9 and section 11 of rail 10.

Figure 4:
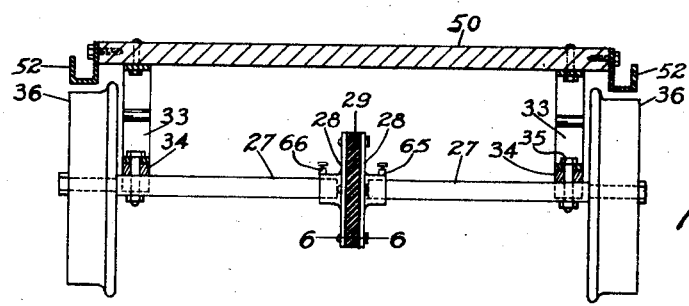
Fig. 4 is a cross sectional view on line 4—4 of Fig. 2.
Figure 5:
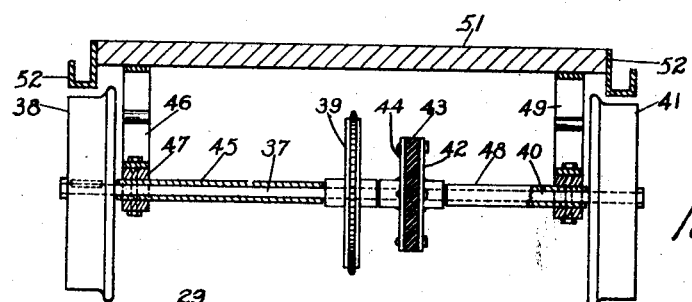
Fig. 5 is a cross sectional view on line 5—5 of Fig. 2.
Figure 6:
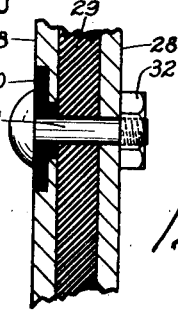
Fig. 6 is a cross sectional view on line 6—6 of Fig. 4.

The vehicle 23 comprises a forward truck structure 24 and a rear truck structure 25 upon which a body of any suitable design, for example, an automobile body 26, is mounted. As shown in Fig. 4 the forward truck 24 comprises a pair of stationary axles 27 provided with flanges 28 which are secured together and electrically insulated one from the other. As shown in Figs. 4 and 6, an insulating block 29 receives the flanges 28 in abutment against the opposite sides thereof and one of the flanges 28 is provided with a suitable insulating collar 30 which extends through the flange 28 and abuts the insulating block 29. Collar 30, insulating block 29 and flange 28 are provided with aligned perforations for receiving a bolt 31. A nut 32 is provided on the end of bolt 31 so that the parts may be secured one upon the other, as shown in Fig. 6. Vehicle springs 33 are mounted upon suitable insulating blocks 34 and are fastened upon the stationary axles 27 by bolts 35 which pass through the springs 33, blocks 34 and axles 27.

Figure 2:
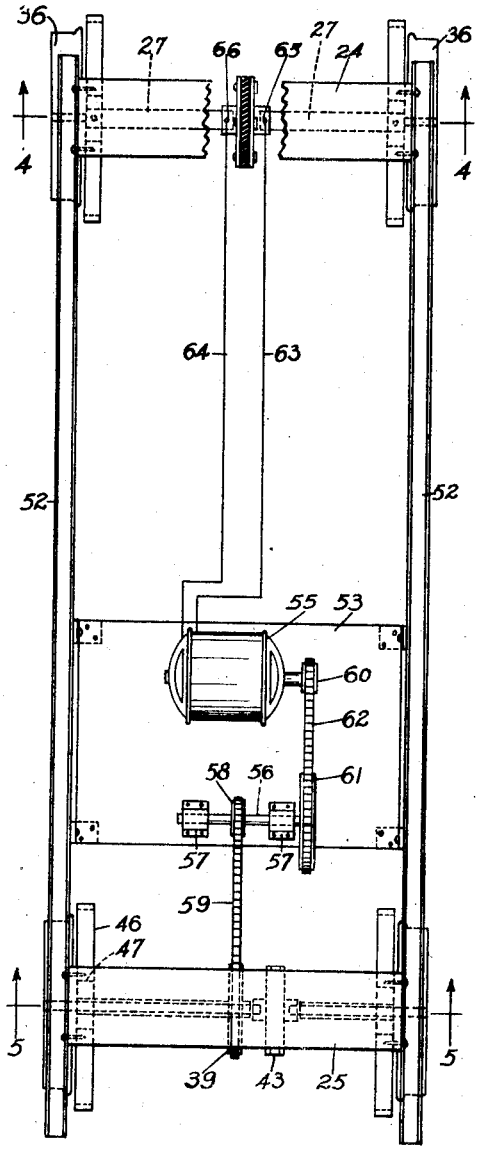
Fig. 2 is a plan view of a vehicle chassis employed in the device of my invention.
Figure 3:
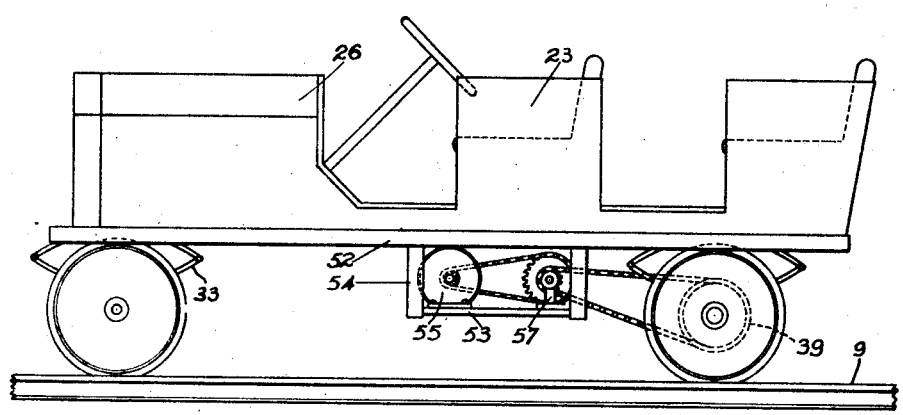
Fig. 3 is a side elevational view of a vehicle shown in Fig. 2.

Suitably flanged wheels 36 are then mounted for free and independent rotation upon the axles 27. The rear truck structure comprises a simple and inexpensive driving and differential mechanism. A drive axle 37 has rear drive wheel 38 and sprocket 39 keyed thereto at its opposite ends. A stationary rear axle 40 has a wheel 41 mounted for free rotation thereon at its one end. The axles 37 and 40 are insulated one from the other substantially as in the forward truck, namely by means of a flange 42 secured to axle 40 which in turn has insulating block 43 and flange 44 secured thereto. The flange 44 is provided with a suitable bearing for the inner end of drive axle 37. A tube 45 encircles the major portion of drive axle 37 and one rear spring 46 is secured by means of a suitable shackle 47 upon the tube 45. A section of tube 48 serves to encase the stationary rear axle 40 and also to support the remaining rear spring 49. Mounted upon the top of forward springs 33 and rear springs 46 and 49, are suitable cross members 50 and 51 which are of wood in order to insulate the opposite springs of the truck one from the other and to which are secured longitudinal channel beams 52 upon which the body 26 of the vehicle may be mounted. A support platform 53 is suspended intermediate the forward and rear trucks by any suitable means such as brackets 54 secured to the channels 52. As shown in Fig. 2, the support platform 53 carries an electrical motor 55 and a suitably supported counter shaft 56. Mounted on counter shaft 56 between suitable bearing blocks 57 is a sprocket 58 aligned with sprocket 39 on drive axle 37. A drive chain 59 passes over sprockets 58 and 39. The motor 55 is provided with a drive pinion 60 with drive sprocket 61 mounted on the outer end of counter shaft 56 through suitable drive chain 62. Feed wires 63 and 64 are connected to the opposite sides of the forward truck by terminals 65 and 66 respectively.

From the foregoing it will be apparent that when one or more of the vehicles are placed upon the rails 9 and 10 carrying electrical current, said current will pass from rail 9 to one of the wheels 36 through axle 27 to terminal 66, feed wire 64 to motor 55 and return through feed wire 63, terminal 65, axle 27 and wheel 36 to the rail 10. Thus the motor is energized and the vehicle or vehicles will travel around the course so long as the rails are energized.

In operating the device the operator is positioned conveniently to switches 18, 20 and 21 so that he has control of any vehicle upon the course. Referring to Fig. 1, and assuming that two of the vehicles 23 are in a position of rest, on section 14 of rail 10. At this time the switch 21 would be open. One or more vehicles 23ª may also be in a position of rest with the wheels thereof contacting section 13 of rail 10, and switch 20 would also be in an open position. Assuming now that the operator desired to begin operation of the device, he would close master switch 18 which would energize rail 9 and section 11 of rail 10. Switches 20 and 21 being open, the vehicles 23 and 23ª contacting sections 13 and 14 of the rail 10 would remain stationary. After loading the vehicles on section 14, the operator would close switch 21 thereupon energizing the rail 14 and starting the motors 55 in each of the vehicles. The vehicles would then move forward until the forward wheels of each vehicle moved on to section 11, whereupon said vehicles would move along on the course over rails 9—11. Assuming now that the operator wishes to bring vehicle 23ª to the loading station, he would open switch 21 and close switch 20 whereupon rail 13 would become energized and motor 55 in vehicle 23ª would move forward on to section 14, whereupon the motor 55 would again be deenergized. After the vehicles have substantially covered the course, and the wheels pass on the section 12 of the rail 10, the motors of said vehicles automatically become deenergized because the section 12 is at all times dead or without electrical energy. In this way, the vehicles are automatically stopped without any special attention of the operator. Suitable rheostats, not shown, may be provided for each of the switches in order to regulate the current passing to each section so that in this way the operator may control the speed of the vehicles on each of the sections of the course. In the event of an emergency of any kind, the operator may instantly deenergize the motors of all vehicles upon the course by opening the master switch 18. From the foregoing it will be apparent that while the course may be laid out in a complicated manner and a large number of vehicles may be operated thereon, it is possible for a single operator to control and manage the entire device.

It would be observed that by using the divided rear axle, there has been provided a simple and efficient differential system for the rear truck, and that by mounting the counter shaft 56 between the bearings 57, the torque of the driving means upon the vehicle structure is greatly reduced. For this reason it is possible to manufacture the vehicles quite inexpensively and at the same time to provide a safe and efficient device.

What I claim is:

1. In a device of the class described the combination of an endless rail and a second rail comprising sections electrically insulated from the first rail and from one another, a source of electrical energy controllable to provide independent electrical circuits with the first rail and several of the sections of the second rail, one of said sections being free of connection with the source of electrical energy, a vehicle having wheels of electricity conducting material insulated from one another and adapted to contact with the rails, and an electric motor carried by the vehicle and having electrical connection with the wheels.

2. In a vehicle of the class described the combination of a nonrotating axle having its opposite ends electrically insulated one from the other, a rear axle comprising a revoluble section and a non-revoluble section in alignment therewith, and electrically insulated therefrom, metallic wheels mounted for free rotation upon the ends of the front axle and upon the end of the non-rotating section of the rear axle, a wheel fixedly mounted on the revoluble section of rear axle and an electric motor having a driving connection with the last mentioned section of rear axle and electrically connected to opposite ends of the front axle.

3. In a vehicle structure the combination with a driven shaft and an aligned stationary shaft, a wheel fixedly mounted to the driven shaft, a second wheel freely revoluble on the stationary shaft and power means for actuating the driven shaft.

4. In an amusement device the combination of an endless track comprising parallel rails, one of said rails forming a continuous electrical conductor, the other of said rails being provided with sections, electrically insulated from one another and from the first mentioned rail, means for independently connecting the first mentioned endless rail and the several insulated sections excepting one of the second rail with a source of electrical energy and a motor driven vehicle supported on the track and adapted to complete an electrical circuit through the continuous rail and one of the sections of the second mentioned rail for energizing the motor of the vehicle.

In testimony whereof, I have hereunto subscribed my name this 17th day of September, 1925.

JOHN J. SCHMID.